Dec. 13, 1938.  M. O. RANOE  2,139,850
OPTICAL FUSIONMETER
Filed April 19, 1937  3 Sheets-Sheet 1

Inventor
MATTHEW O. RANOE
By Chas. C. Reif
Attorney

Dec. 13, 1938.   M. O. RANOE   2,139,850
OPTICAL FUSIONMETER
Filed April 19, 1937   3 Sheets-Sheet 2
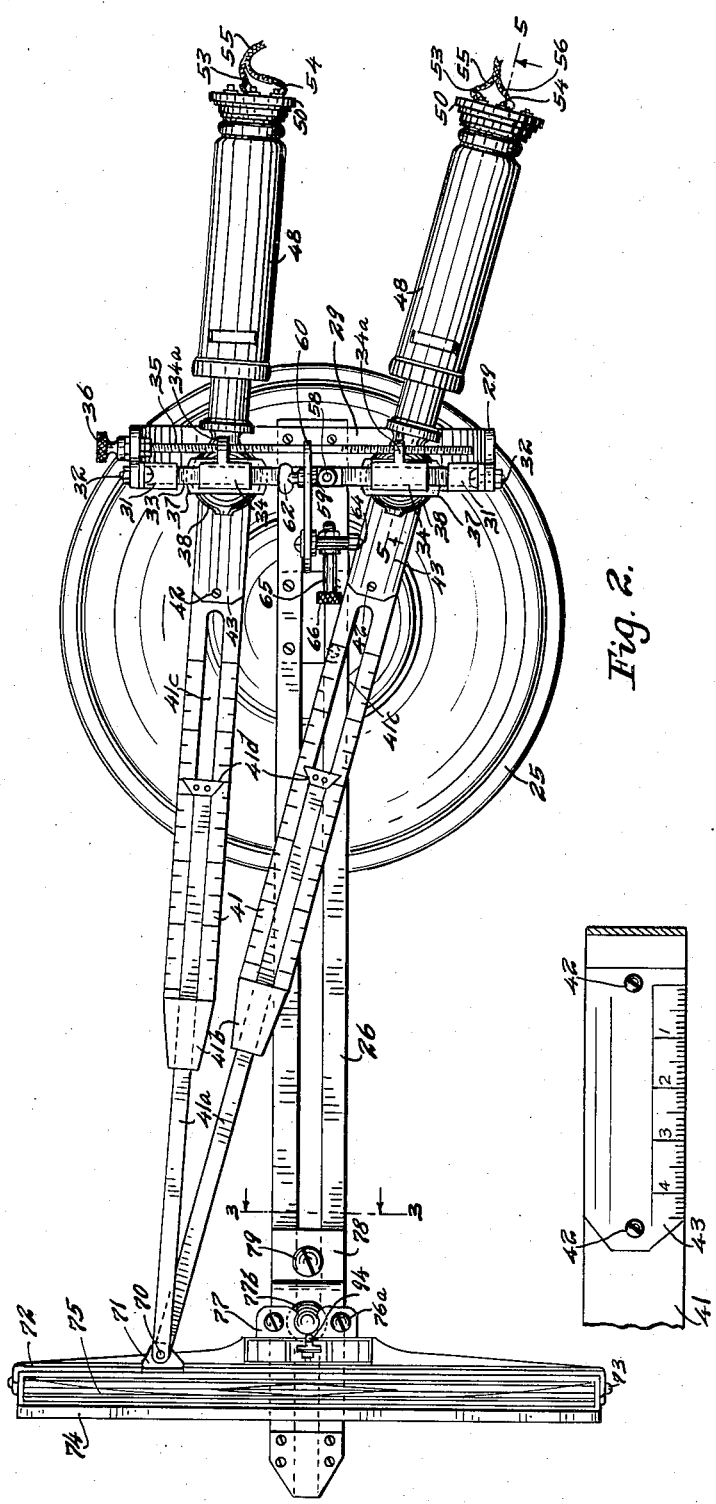
Fig. 2.
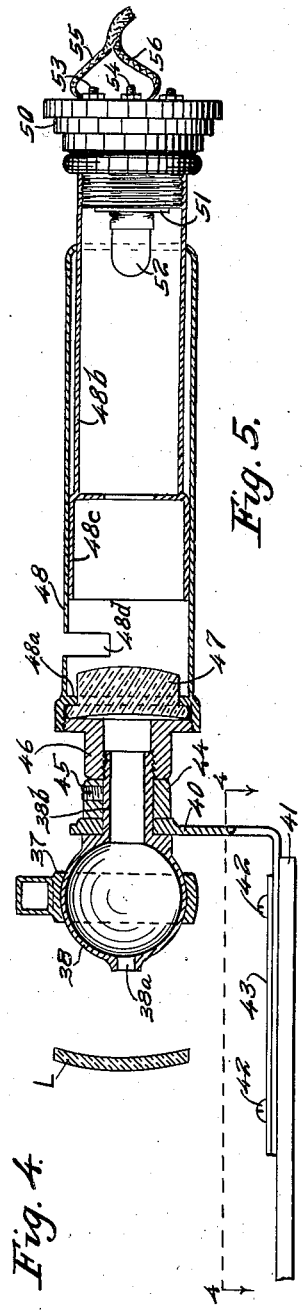
Fig. 5.
Fig. 4.
Inventor
MATTHEW O. RANOE
BY Chas. E. Reif.
Attorney Dec. 13, 1938.  M. O. RANOE  2,139,850
OPTICAL FUSIONMETER
Filed April 19, 1937  3 Sheets-Sheet 3

Inventor
MATTHEW O. RANOE
By Chas. C. Reif.
Attorney

Patented Dec. 13, 1938

2,139,850

UNITED STATES PATENT OFFICE 2,139,850

OPTICAL FUSIONMETER

Matthew O. Ranoe, Minneapolis, Minn.

Application April 19, 1937, Serial No. 137,603

22 Claims. (Cl. 35—17)

This invention relates to an ocular device and particularly to a device for visually illustrating the effect of lenses used in a pair of spectacles so that said lenses may be selected for the most restful and beneficial effects on the eyes.

The eyes when viewing an object and particularly when viewing a near object, as when reading a page of printed matter, must make certain movements or adjustments to give the best obtainable vision. One of these adjustments is the accommodation of the eye including the parts and lens thereof to give the proper focus. Another movement necessary is to give the proper angular direction to the eye, which might be referred to as convergence.

It is an object of this invention to produce an instrument for visually representing the effect of a pair of spectacle lenses so that the proper relation may be obtained in the convergence and accommodation of the eyes.

It is another object of the invention to provide an instrument having a pair of members simulating the eyes of the patient through which light is projected upon a reading surface so that the prismatic effect of a pair of spectacle lenses may be observed and lenses selected which will necessitate the least effort on the part of the eyes for reading.

It is more specifically an object of the invention to provide an instrument comprising a pair of members simulating the eyes of the patient and mounted for universal movement, said members having apertures at one side simulating the pupils of the eyes, together with means for projecting light through said apertures upon a surface which may be placed at different distances and a means for holding a pair of lenses adjacent said apertures so that the effect of said lenses in transmitting said light may be observed upon said surface.

It is still another object of the invention to provide such a device as set forth in the preceding paragraph, said surface having certain tables or scales thereon, said members preferably being moved by a pair of bars extending therefrom to a point adjacent said surface and means being provided to properly focus the light projected through said members.

These and other objects and advantages of the invention will be fully set forth in the following description made in connection with the accompanying drawings in which like reference characters refer to similar parts throughout the several views and in which:—

Fig. 2 is a top plan view of the device;

Fig. 4 is a horizontal section taken on line 4—4 of Fig. 5 as indicated by the arrows;

Fig. 5 is a view partly in side elevation and partly in vertical section taken substantially on line 5—5 of Fig. 2 as indicated by the arrows;

Figure 6:
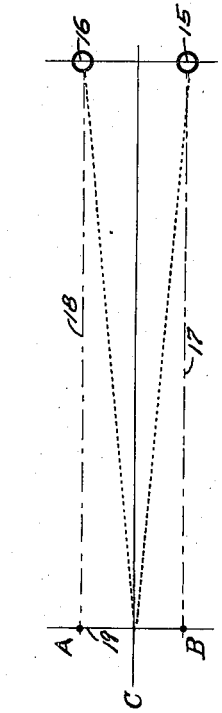
Fig. 6 is an illustrative diagram.

When the two eyes are facing directly forward, each having its axial median line drawn at right angles to a base line which touches the corneal surface at the pupil of each eye, then both eyes are in a position of rest. This is illustrated in Fig. 6 where 15 represents the left eye and 16 the right eye. The left eye is facing in the direction of line 17 directed to a point B while the right eye is facing in a line 18 directed to a point A, points A and B being in a line or surface 19. The eyes in this position could be said to be in a "static condition", for in such a position there is no muscular effort of the extrinsic muscles to converge or to diverge (adduction and abduction) and as the eyes are gazing into space, known in Optics as "infinity", there is also no effort to accommodate, that is, to focus the eyes at any fixed point. Therefore, in the said position the eyes are in a state of perfect rest and relaxation as far as all voluntary efforts are concerned. Assume now that the eyes will look at a point C midway between points A and B and at a distance of 13 inches from said base line. Each eye will now be obliged to move inward from its former position and this is called adduction or convergence. Both eyes are now also focusing on the point C and if the eyes are emmetropic (having no need for extra accommodation for errors) each eye will now be accommodating three diopters in order to read at the point C. In the above position each eye is obliged to use an equal amount of effort as to accommodation as well as to convergence. However, this is the only position that the human eyes can place themselves wherein the efforts are equal both as to accommodation and convergence in the two eyes at the same time. This fact is rather basic in the development of the present invention for in all other imaginable positions each eye must of necessity alternate in its functions in order to be in perfect fusion and in perfect visual acuity with its companion eye.

Figure 7:
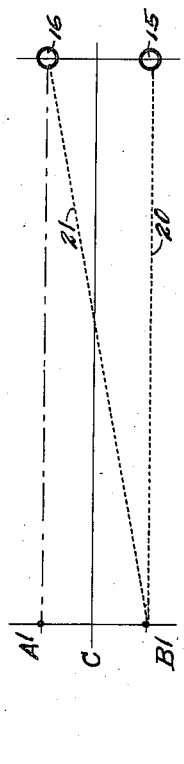
Fig. 7 is an illustrative diagram.

Referring to Fig. 7 let it be assumed that both eyes are now directed at the point B1, which is directly in front of the left eye, and say, at 13 inches distant. Both eyes must move from the position they had in viewing point C. The left eye, whose vision is in line 20, need make no effort as to convergence but must accommodate for three diopters. The right eye, whose vision follows line 21, must make all of the effort for convergence in order to focus at the point B1 or to read with the left eye at said point. The right eye must also accommodate to a lesser degree than the left eye as the distance to the point B1 from the right eye is much greater than the distance of said point from the left eye. It will be apparent that just the reverse will be true if both eyes focus on the point A1 in Fig. 7. From the above discussion it is seen to be true that each eye not only has the capability of alternating, but must of necessity in order to carry on its conjugate duty in harmony with its companion eye, alternate from a state of rest, while the companion eye is doing all of the converging, back to a state in which both eyes have equal convergence. The latter position as above stated is the only point where eye efforts will be equal even in emmetropic eyes. The accommodation as also pointed out is changing from one eye to the other, the same being equal only in the median line. This accommodation is a gradual variation to as much as one-half diopter at the extreme edge of an ordinary business letter.

Figure 8:
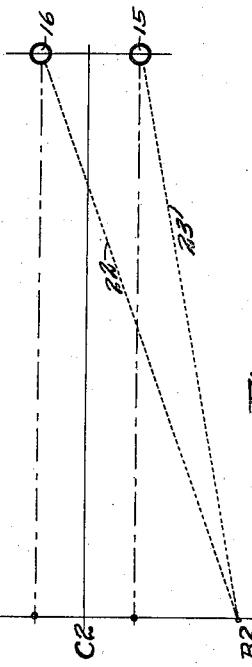
Fig. 8 is an illustrative diagram.

Figs. 6 and 7 relate only to eye movements within the pupillary widths or the distances between the centers of the pupils. Now assume that the two eyes are to read an ordinary business letter of eight inches in width placed at a distance of 13 inches from the eyes. Referring to Fig. 8 the point B2 will represent the left hand side of the letter which is four inches from the median line or point C2. Assuming that the eyes now focus on the point B2 it will be seen that the right eye, the line of vision of which is indicated as 22, must do all of the converging. The left eye, whose vision follows line 23, is now diverging. The right eye is really over-converging which requires a far greater effort of energy expenditure because of the muscle attachments on the eye balls than is required merely to converge to the median line or point C2. Furthermore, the left eye must now make a new expenditure of energy effort in the act of divergence. Now as the two eyes are reading the said letter they must both work in unison toward the right hand side of the page, with the result that the efforts of convergence as well as of accommodation are constantly changing and alternating from one eye to the other on either side of the median line. As the letter is being read and both eyes arrive at the extreme right hand side of the page or at point A2, the right eye is diverging while the left eye is over-converging which, as above stated, means a much greater effort than mere convergence to the median line or point C2. From the above discussion and consideration it will be easily observed that the term "convergence" does not indicate the actual work of the two eyes as involving the extrinsic muscles because true convergence does not obtain equally in the two eyes except for a small fraction of the time. At all other times the internal recti muscles, which are commonly credited with "convergence", are merely working in conjugate action with the external recti muscles in order to obtain and to maintain fusion. The designation "fusional effort" has been thus coined to take the place of convergence. It will also be seen from the above discussion that no fixed relation exists between "accommodation" and "convergence" but that the function of "fusional effort" is constantly changing and alternating from eye to eye in order that the two eyes may each accurately and independently adjust to points of fusion within themselves as well as in conjugation with the companion eyes.

There is also an unequal prism effect by lenses. From the foregoing discussion in connection with Figs. 6, 7 and 8 it will easily be observed that when lenses are used to correct errors of accommodation and the eyes are deviating to one side or the other of the median line, where all lenses are centered for near work, the farther the fusion point is removed from the median line the greater will be the prismatic effect of any lens, but because the point of rotation of each eye varies in distance from the point of fusion, the prismatic effect is also unequal, thereby causing extra muscular effort and discomfort never before recognized in connection with ocular practice. The same thing is also true in the vertical meridian causing eye discomfort in the form of imbalances in near work and especially in cases needing bifocal lenses.

The present invention, which might be called an accommodato-convergo fusionmeter, demonstrates visually the action and effect of lenses and is really necessary for correct fitting of pupillary distances and all types of lenses for all types of work.

Referring to the drawings, Figs. 1 to 5, a device is shown comprising a base member 25. While various forms of base members might be used, in the embodiment of the invention illustrated member 25 is shown as having a circular lower portion and an upstanding substantially cylindrical central portion 25a. The latter portion at its upper end is narrowed into a substantially semi-circular plate-like portion 25b and lugs or ears 26a are disposed at either side thereof and clamped thereto by a headed bolt 27 equipped with a thumb wing nut 28. Ears 26a are rigidly secured to a bar or supporting member 26 shown as having spaced longitudinally extending and parallel portions illustrated as substantially rectangular in vertical cross section. A U-shaped member 29 is rigidly secured to one end of bar 26 by a plurality of screws 30 and the upstanding parallel arms of member 29 have secured thereto adjacent their upper ends small brackets 31 by the screws 32. Brackets 31 have hollow rectangular-shaped portions projecting toward each other and a bar 33 has its ends disposed in said portions and extending therebetween. A pair of members 34 surround bar 33 and are slidable thereon, the same having rearwardly projecting ears 34a into which is threaded a screw 35. Screw 35 has oppositely disposed threads respectively engaging portions 34a and said screw extends through one side of member 29, being journaled therein and equipped with a knurled operating knob 36 at its end. Each member 34 has rigidly secured to its underside an annular member 37. Members 37 have inner surfaces which are partly spherical and which have disposed therein a pair of substantially spherical or ball-like members 38. Members 37 may be split at their lower ends and have projecting ears 37a adjustably connected by headed and nutted bolts 38, although this is not absolutely necessary. The members 38 are hollow and are shown as having small bosses at their forward sides which are provided with apertures 38a. Members 38 are of substantially the same size as the human eye ball and are mounted for universal movement in members 37 about points substantially at the centers thereof. Members 38 have portions 38b projecting from the side opposite apertures 38a and passing through vertical portions of right-angular brackets 40 having horizontal portions secured respectively to bars 41 by screws 42 also holding in place scale-carrying plates 43. A collar 44 held in place by a screw 45 secures member 38 to bracket 40 and a member 46 is threaded on the end of portion 38b. A tube 48 has an enlarged portion threaded on an enlarged portion of member 46 and has a flange 48a therein holding in place a focusing lens 47. Another tube 48b therein is slidable in tube 48 and projects therefrom, the same having an enlarged portion 48c fitting in tube 48 and adapted to engage the outer end of tube 48 to act as a stop. Tube 48 is provided with an opening 48d some distance in the rear of lens 47 adapted to receive a supplemental lens when the same is necessary. Tube 48 has a closure member 50 at its outer end forming the support for a lamp socket 51 which receives a small electric lamp bulb 52. This lamp preferably is of the type known as a streak lamp having a filament extending diametrically thereof. The terminal connections 53 and 54 of lamp socket 51 are disposed in the outer end of member 50 and have connected thereto the cords 55 and 56 carrying electrical conductors through which current is supplied to lamp 52.

Bar 33 has a screw 58 extending centrally therein securing in place a small bracket 59 having an upstanding flat portion with a slot extending longitudinally therein. Another bracket 60 of thin plate-like form has a central slot extending longitudinally thereof and is connected to bracket 59 by a headed bolt 61 equipped with a clamping wing nut 62. It is obvious that bracket 60 may be adjusted transversely of bracket 59 as well as longitudinally thereof by loosening bolt 59. A small clamping bracket 63 is carried on a headed and nutted bolt 64 extending through the slot in bracket 60. Bracket 63 has a clamping screw 65 equipped with a knurled head 66 and is adapted to hold a pair of spectacles.

The bars 41 have slidably connected thereto portions 41a extending through the thickened portions 41b of bars 41 and slidable in the central longitudinally extending slot 41c in each bar 41. Bars 41 are graduated in inches on one side and in diopters on the other and end plates 41d on portions 41a shown as of trapezoidal form have their ends adapted to cooperate with the said graduations. Portions 41a of bars 41 are provided with apertured ends adapted to have extend therethrough an upstanding pin 70 carried on a small bracket 71 slidable in a slot 72a of a frame member 72. Frame member 72 has upstanding side portions between which is received and secured by screws 73 a frame 74 having therein a chart 75. Frame member 72 is secured to a plate 76 carried on a bracket 77 clamped by screws 76a about a ball 77b upstanding from a base portion 77a secured to the upper offset portion 78a of a plate bracket 78. Bracket 78 has a headed screw 79 extending therethrough and through the opening formed by the spaced parts of bar 26, said screw being provided with a clamping wing nut 80. The chart 75 comprises a pair of spaced vertical lines 81 marked zero which are spaced apart about two and one-half inches or the average pupillary distance. Vertical lines 82 substantially one-fourth of an inch apart extend across the chart throughout its length. An arcuate line 83 drawn substantially on a 13 inch diameter extends between the lower corners of the chart. Oblique lines 84 extend upwardly and outwardly from the points where line 83 crosses the lines 82 to a horizontal line 85. There are also horizontal lines 86 some distance from the top and bottom of the chart and a median horizontal line 87. The vertical lines are numbered as are also the points where curve 83 intersects lines 82. The chart also contains certain inscriptions or legends.

Another chart 90 is disposed on plate 76 centrally below chart 75. A slot 91 extends centrally of chart 90 in which is slidable a portion of a small bracket 92 which may be clamped in any desired position by a clamping nut 93. Bracket 92 has at its lower portion a pin 94 having a substantially vertically extending outer end over which the ends of portions 41a of bars 41 are adapted to engage. Chart 90 at each side of slot 91 has a horizontal line designated zero and horizontal graduations are disposed above and below said line being spaced certain divisions of an inch apart. The scales on the plates 43 are graduated in centimeters and millimeters.

Figure 1:
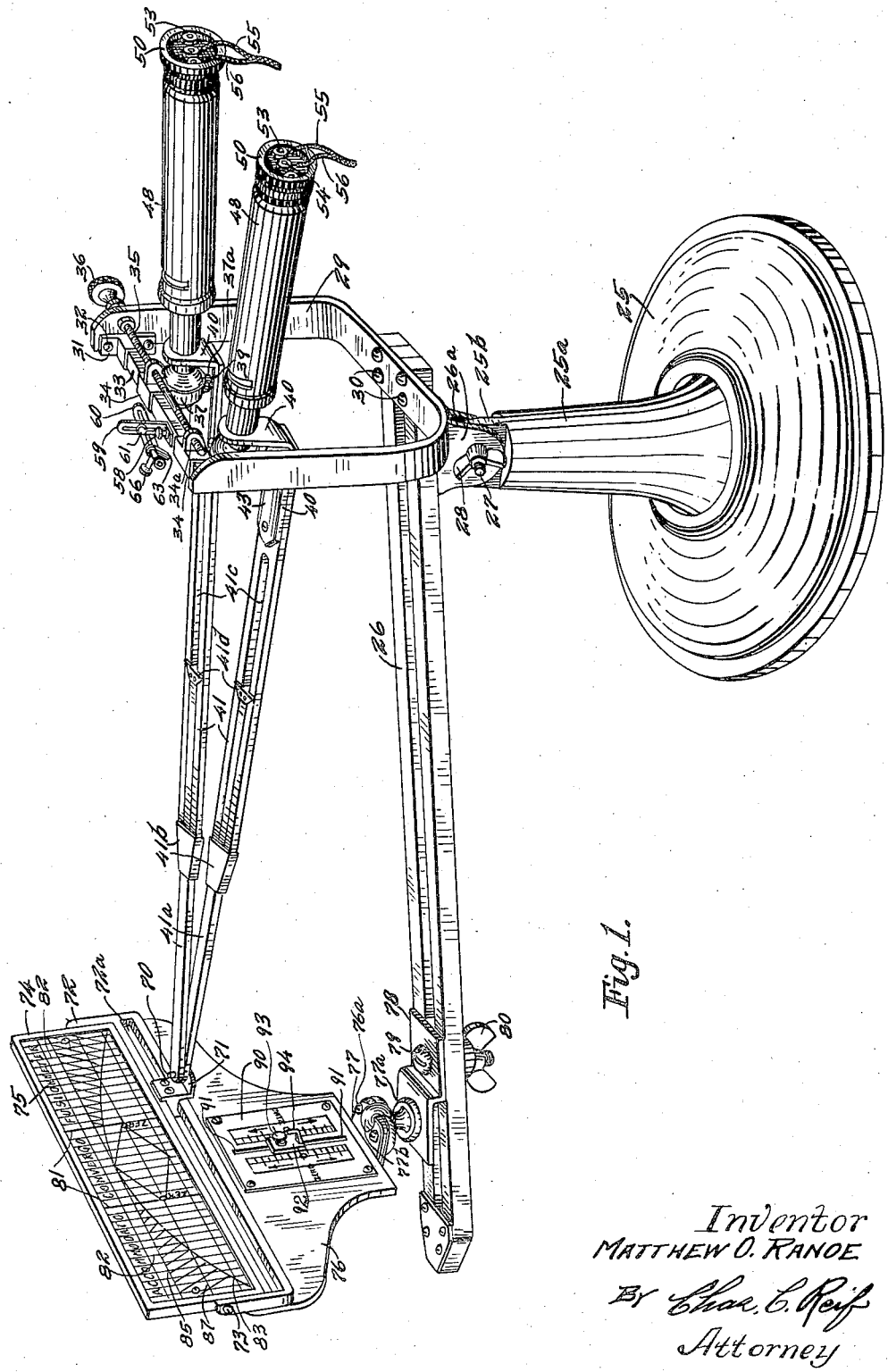
Fig. 1 is a perspective view of the device.

When a pair of spectacle lenses are to be tested in the device, they will be supported in front of the members 38 and the apertures 38a thereof. The distance the lenses normally occupy on the patient in front of the front corneal surface is determined and the lenses are supported the same distance in front of members 38, the scales on plates 43 which are graduated in centimeters and millimeters being used to determine this distance. The reading surface on the charts 75 and 90 is then adjusted to a certain distance, depending on the work for which the lenses are used. This distance may be 13 inches. This distance is measured on the bars 42, the graduations thereon indicating the distance in inches of the surface of the chart from the front apertured ends of members 38. The lenses are held in position usually by clamping the nose piece of the spectacles in the bracket 63. It will be seen that the position of the lenses can be adjusted horizontally and vertically as desired by brackets 60 and 59. With the lenses so positioned the bracket 71 will be moved so that the pin 70 registers with the central line 82 between lines 81. The bars 41 are now moved and the apertured ends placed over pin 70 as indicated in Fig. 1. When bars 41 are moved members 38 are similarly moved and the axes of apertures 38a and tubes 48 always aline with the median lines of bars 41. The axes of apertures 38a are thus directed toward the central line of chart 75. The lamps 52 will now be illuminated by turning a suitable switch and a beam of light will be projected through members 38 and apertures 38a onto the chart 75. The lamp 52 will cause a vertical streak of light on said chart and this will be sharpened and focused by adjusting the tube 49 in the tube 48. In some cases where there is a great correction in the spectacle lenses it may be necessary to use a supplementary focusing lens 47. Usually this is not necessary. The illuminated streaks on chart 75 will usually be found to be spaced from each other. Sometimes it will be found that the streak from the right hand member 38 is at the left of the center line of the chart while the streak from the left hand member 38 is at the right of the center line. This shows that the rays entering the eyes are really crossing each other from the printed page. The eyes must make this further correction in reading and this places a strain upon the eyes. It is the ideal condition to have the streaks projected onto the chart coincide. There is no instrument heretofore devised so it is believed that will show so readily and clearly what the lenses are accomplishing. The bracket 71 can be moved lengthwise of the chart 75 and the position of the illuminated streaks determined at all points. The bars 41 must be lengthened as they move toward the sides of the chart and their ends thus do not move in a circular arc. The illuminated streak for a given one of the lines 82 will thus really appear at the upper end of the diagonal line 84 which extends from the circular arcuate line 83.

There is always a prismatic effect caused by the lenses and this prismatic effect throws the focal point out of registry or fusion both vertically a well as horizontally. By placing the ends of bars 41 on the pin 94 and turning members 50 so that the illuminated streak will be horizontal, the said streaks from the lamps 52 will be projected onto the chart 90. The necessary adjustment of the lenses to cause coincidence of the focal point vertically as well as horizontally can be determined. The tests can be made with both the distance lens and the near lens in bifocal glasses.

Figure 3:
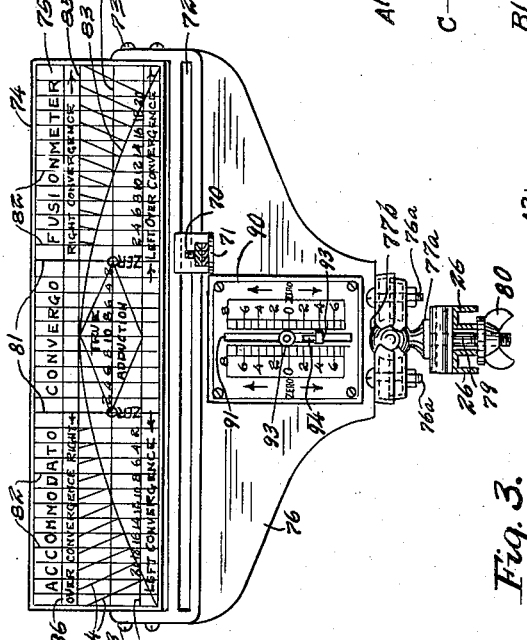
Fig. 3 is a vertical section taken substantially on line 3—3 of Fig. 2 as indicated by the arrows.

The charts 75 and 90 are graduated in diopters. Thus if a test is made at the line marked 20 where it crosses the lower line 86 at the left hand side of the chart as seen in Fig. 3 the left eye would be diverging 20 diopters while the right eye would be converging or over-converging 40 diopters. When a test is made at a certain point on either chart, the chart shows the number of diopters that the lens is off or the number of diopters out of desired fusion. It is easy then for the optician to add sufficient prismatic effect to the lens to give the proper fusion. The lenses can thus be made to give the best possible conditions for the eyes.

From the above description it is seen that applicant has provided a simple and efficient machine for testing lenses constructed from principles and facts never before recognized in the ocular field. The device quickly and accurately shows the effects or results which the lenses are giving. The device has been instrumental in really affecting or being the indicating cause for remarkable therapeutics. Many patients with extreme nervous disorders, headaches and other disturbances without apparent cause have as a result of tests made on their spectacle lenses been properly fitted and relieved of their trouble. In all of these cases the parties supposed they had properly fitted glasses. The device has been amply demonstrated in actual practice and found to be very successful and efficient.

It will, of course, be understood that various changes may be made in the form, details, arrangement and proportions of the parts, without departing from the scope of aplicant's invention, which generally stated, consists in a device capable of carrying out the objects above set forth in the parts and combinations of parts disclosed and defined in the appended claims.

What is claimed is:—

1. A device of the class described having in combination, a pair of spaced hollow members simulating an eye ball and having apertures therein at one side simulating the pupil of said eye, said members being freely movable universally to make various angles laterally and vertically between the axes of said apertures and the horizontal axes of said members respectively, means for projecting beams of light through said apertures respectively and a member having a reading surface spaced from said hollow members for receiving said light.

2. A device of the class described having in combination, a pair of spaced hollow members simulating an eye ball and having apertures therein at one side simulating the pupil of said eye, said members being freely movable about a point therein substantially at the center thereof, means for projecting a beam of light through said opening, a member having a reading surface spaced from said hollow members for receiving said light and means for moving said hollow members together or apart.

3. The structure set forth in claim 1, means for holding lenses a short distance from said first mentioned members respectively and between the same and said surface and means for varying said distance.

4. The structure set forth in claim 1, bars secured to said first mentioned members movable therewith and extending to said surface for directing the axes of said apertures to a desired point or points on said surface.

5. The structure set forth in claim 1, said reading surface having spaced vertical graduations thereon and means movable adjacent said surface and connected to said hollow members for moving the same so that the axes of said apertures are directed toward a certain one of said graduations.

6. The structure set forth in claim 1, means for holding lenses a short distance from said apertures respectively and between the same and said surface and means for varying the position of said lenses both vertically and horizontally.

7. The structure set forth in claim 1, said reading surface having thereon a chart having horizontal graduations and means movable adjacent said chart and connected to said hollow members for moving said members and directing the axes thereof toward one of said graduations.

8. A device of the class described having in combination, a pair of spaced substantially spherical hollow members simulating the human eye balls and substantially the size of the human eye ball and having apertures therein at one side simulating the pupil of said eye, said members being freely movable about a point therein, means for projecting a beam of light through each of said apertures and a member having a reading surface spaced from said members for receiving said light, said surface having a horizontally extending scale thereon with vertical lines spaced substantially the same distance apart as said apertures with convergence and divergence zones at the remote sides of said lines.

9. The structure set forth in claim 1, said surface having a vertically extending scale thereon with a central zero line and spaced graduations above and below said line.

10. A device of the class described having in combination, a pair of spaced hollow substantially spherical members simulating the human eye ball and having apertures therein at one side simulating the pupil of said eye, said members being universally movable, tubes extending in substantially parallel relation from the sides of said members opposite said apertures, lamps in said tubes respectively adjacent the ends thereof, a member having a reading surface spaced from said members at the side oposite said tubes upon which light from said lamps is projected and means for holding lenses in front of said apertures.

11. The structure set forth in claim 10, said tubes having portions telescoping therein and outwardly movable therefrom in which said lamps are carried and a focusing lens disposed forwardly of each of said lamps.

12. The structure set forth in claim 10 and focusing lenses disposed in each of said tubes.

13. The structure set forth in claim 10, focusing lenses disposed forwardly of each of said lamps, said tubes having means for receiving compensating lenses.

14. A device of the class described having in combination, a pair of substantially spherical hollow members substantially the size of the human eye, said members having apertures therein at one side simulating the pupil of said eye, said members being mounted for universal movement about a point therein, means for projecting a beam of light through said apertures, a member having a reading surface spaced from said members for receiving said light and means for holding lenses in front of said apertures.

15. A device of the class described having in combination, a pair of hollow edge members simulating a human eye ball, the same being universally mounted for movement about a point therein, each of said members having an aperture at one side thereof simulating the pupil of the eye, means for projecting a beam of light through each of said members, a member having a surface some distance from said members on which said beam of light is received and means for focusing said beam on said surface.

16. A device of the class described having in combination, a pair of spaced hollow members each having an aperture at one side, said members representing the human eye balls respectively, said members each being movable about axes which extend at an angle to each other, means for projecting beams of light through said members and apertures respectively and a member having a reading surface spaced from said members for receiving said beams.

17. The structure set forth in claim 16, said reading surface having a chart thereon with spaced vertical lines spaced apart substantially the distance that said apertures are spaced, said chart having a zone between said lines and a zone at the remote side of each line, said zones being graduated with spaced vertical lines indicating diopters.

18. The structure set forth in claim 16, said chart having a scale thereon having a central horizontal line and vertically spaced graduations at each side of said horizontal line.

19. A device of the class described having in combination, a member having a reading surface arranged to show the effect a lens is producing, a pair of spaced means disposed some distance from said reading surface for projecting beams of light upon said surface, said means being spaced substantially the pupillary distance of the patient and means for holding lenses adjacent said means.

20. The structure set forth in claim 19 and means movable adjacent said surface and extending to and connected to said first mentioned means for causing said means to direct light upon the same point on said surface.

21. A device of the class described having in combination, a pair of members spaced horizontally substantially the pupillary distance of the patient, said members having apertures at one side respectively and both being movable about axes which extend at an angle to each other, means for projecting beams of light through said apertures respectively and a member having a surface spaced some distance from said first mentioned members upon which said beams are directed.

22. A device of the class described having in combination, a pair of horizontally spaced members and each having an aperture therethrough, each of said members being movable about axes which extend at right angles to each other, means for projecting beams of light through said apertures and a member having a reading surface spaced some distance from said members upon which said beams are directed.

MATTHEW O. RANOE.